United States Patent [19]

Weissenberger et al.

[11] Patent Number: 4,810,231
[45] Date of Patent: Mar. 7, 1989

[54] TORSIONAL VIBRATION DAMPER HAVING SPRINGS WITH PROGRESSIVE CHARACTERISTICS

[75] Inventors: Helmuth Weissenberger; Alfred Schraut, both of Waigolshausen, Fed. Rep. of Germany

[73] Assignee: Fichtel & Sachs AG, Schweinfurt, Fed. Rep. of Germany

[21] Appl. No.: 894,642

[22] Filed: Aug. 8, 1986

[30] Foreign Application Priority Data

Aug. 8, 1985 [DE] Fed. Rep. of Germany ... 8522888[U]

[51] Int. Cl.$^4$ ............................ F16D 3/14; F16D 13/64
[52] U.S. Cl. .................................... 464/68; 192/106.2; 267/180
[58] Field of Search ............... 192/106.2; 267/166, 267/167, 180; 464/62, 64, 66, 67, 68, 81

[56] References Cited

U.S. PATENT DOCUMENTS

| 2,636,363 | 4/1953 | Nutt ........................................ 464/68 |
| 3,727,902 | 4/1973 | Burckhardt et al. ................. 267/180 |
| 4,111,407 | 9/1978 | Stager .................................. 267/166 |
| 4,120,489 | 10/1978 | Borlinghaus .......................... 267/61 |
| 4,499,981 | 2/1985 | Nagano .............................. 464/68 X |

FOREIGN PATENT DOCUMENTS

| 3147717 | 6/1982 | Fed. Rep. of Germany . |
| 2327448 | 5/1977 | France .................................. 267/180 |
| 635003 | 2/1962 | Italy ...................................... 267/180 |
| 149432 | 9/1983 | Japan .................................. 267/166 |
| 81528 | 5/1985 | Japan .................................. 267/166 |
| 301075 | 10/1929 | United Kingdom . |
| 1282971 | 7/1972 | United Kingdom . |
| 2145193 | 3/1985 | United Kingdom . |
| 2145800 | 4/1985 | United Kingdom . |
| 2149059 | 6/1985 | United Kingdom . |

*Primary Examiner*—Daniel P. Stodola
*Attorney, Agent, or Firm*—Toren, McGeady & Associates

[57] ABSTRACT

The torsional vibration damper comprises in apertures in an input part and in an output part rotatable in relation to the input part coil thrust springs which couple the input part and the output part together in torsionally elastic fashion. Over a plurality of turns of the coil spring, the diameter of the wire material varies continuously from a first value to a second value. From one end of the spring to the other, it is possible for the diameter to diminish steadily. The diameter can however also either increase or decrease from the middle of the coil sprng towards the two ends. Springs of this type make it possible with relatively minimal structural expenditure to provide torsional vibration dampers which have a progressive characteristic.

1 Claim, 5 Drawing Sheets

TORSIONAL VIBRATION DAMPER HAVING SPRINGS WITH PROGRESSIVE CHARACTERISTICS

BACKGROUND OF THE INVENTION

The invention relates to a torsional vibration damper, particularly for a clutch plate of a motor vehicle friction clutch.

Already known from German published specification No. 31 47 717 is a torsional vibration damper for the clutch plate of a motor vehicle friction clutch which comprises, in apertures in an input part rotatable about the rotation axis of the clutch and in an output part rotatable in relation to the input part, coil springs which couple the input part and the output part to each other in torsionally elastic manner. The coil springs have a cylindrical contour and are wound from wire material of a constant wire diameter. In order to achieve a progressive spring characteristic, each of the coil springs has at least two successive turns of different pitch height or lead. In this way, the spring force increases progressively with increasing spring travel. With minimal angle of relative rotation between input and output parts, therefore, the spring force is small while it increases over-proportionally at a relatively large angle of relative rotation.

The invention is directed towards provision of a particularly economically produced torsional vibration damper, particularly for motor vehicle clutches, which uses progressive springs.

SUMMARY OF THE INVENTION

Within the scope of the invention, the diameter of the wire material of the coil springs which couple the input part and the output part together in torsionally elastic fashion varies over a plurality of turns continuously from a first diameter to second diameter value. As a result, a spring force-spring travel characteristic of very high progressivity is achieved which is most welcome having regard to the suppression of noise in the drive line of a motor vehicle. In comparison with conventional springs, it is possible with springs according to the invention to achieve for the same spring travel approximately 35% greater spring force or for the same force it is possible to achieve an approximately 40% greater spring travel. The springs used in the torsional vibration damper according to the invention can without problem be so dimensioned that at every location over their cross-section the spring can be stressed up to the admissible limit so that the quantity of spring material required is minimal. The wire stock cross-section is expediently reduced continuously by metal removing machining. As a result, any surface faults in the wire material are eliminated and the quality of the resulting coil springs is enhanced. Since the coil springs can be produced readily with contour dimensions such as are normally found already with conventional torsional vibration dampers, it is also possible for conventional torsional vibration dampers to be fitted with the suggested progressive coil springs without problem.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
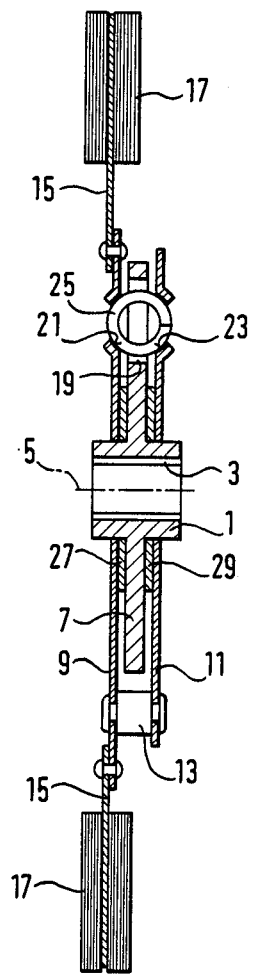
FIG. 1 is a diagrammatic axial longitudinal section through a clutch plate of a motor vehicle friction clutch.

The clutch plate shown diagrammatically in FIG. 1 comprises a hub 1 which, via a system of teeth 3, can be coupled in rotationally rigid but axially displaceable fashion to an input shaft of a motor vehicle gearbox, not shown in greater detail but rotating about an axis of rotation 5. Projecting radially from the hub 1 is a hub flange 7. Disposed axially on either side of the hub flange 7 are side plates 9, 11 which are connected to each other by spacing rivets 13 to form one unit rotatable about the axis of rotation 5 and in relation to the hub 1. Fixed on the side plate 9 is a lining carrier 15 which for its part carries clutch friction linings 17. The hub flange 7 has, offset in a peripheral direction in relation to one another, a plurality of apertures 19 in each of which there is contained a coil thrust spring 25. For each of the apertures 19, there is in the side plates 9, 11 a corresponding aperture 21 or 23 into which the coil thrust spring 25 engages. The end faces of the coil thrust spring 21 which point in the peripheral direction of the hub plate 7 co-operate with whichever is the adjacent oppositely disposed edges of the apertures 19, 21 and 23 coupling the side plates 9 and 11 and hence the friction linings 17 in torsionally elastic fashion to the hub plate 7 and thus the hub 1. Also disposed between the hub plate 7 and the side plates 9, 11 are friction rings 27, 29 which generate a frictional torque between the hub flange 7 and the side plates 9, 11 through axially operative spring means not shown in greater detail, the frictional torque referred to damping any torsional vibrations between these parts in conventional manner.

Figure 2:
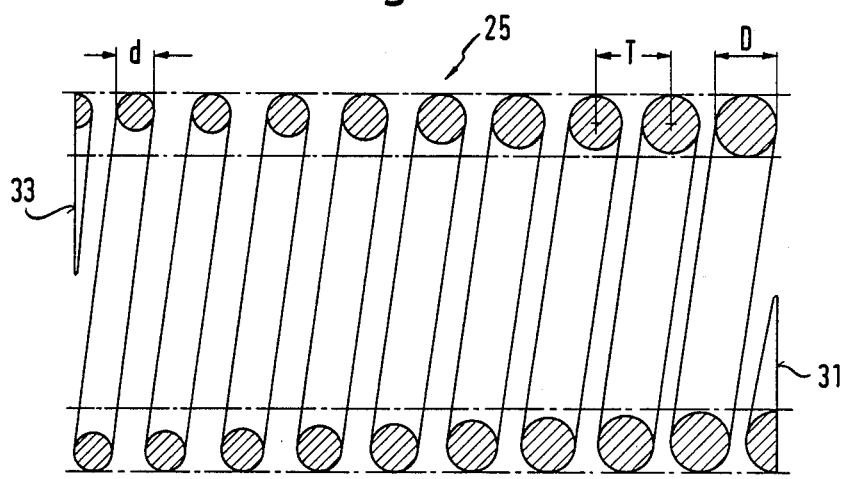
FIG. 2 shows an axial longitudinal section through a coil thrust spring used in the clutch plate according to FIG. 1

The coil thrust springs 25 used in the torsional vibration damper of the clutch plate according to FIG. 1 are of the form shown in FIG. 2 in axial longitudinal section along the coil axis. The coil thrust springs 25 have a cylindrical outer contour and are wound from a wire material of circular cross-section, of which the wire diameter decreases steadily from a maximum wire diameter D at one end of the spring to a minimum wire diameter d at the axially opposite end. As is normal with coil thrust springs, the spring 25 is flattened over a part of its first and its last windings at 31 and 33 respectively. The pitch T of the individual windings, measured in the central axis of the wire, is constant over the entire spring.

Figure 3:
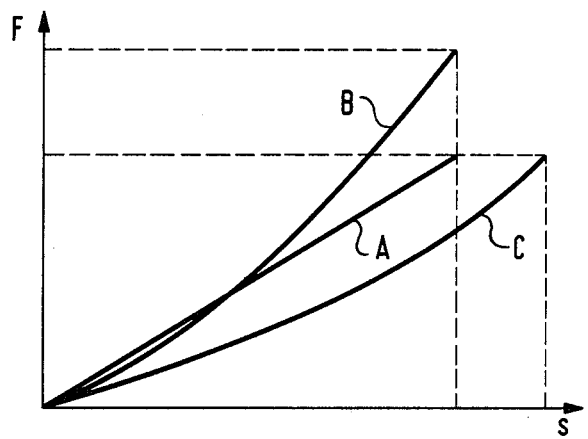
FIG. 3 is a diagram explaining the progressive spring characteristic attainable using springs of the type shown in FIG. 2, and FIGS. 4 to 9 show alternative embodiments of coil thrust springs which can be used in a clutch plate according to FIG. 1 instead of the spring according to FIG. 2.

A spring of the type shown in FIG. 2 has a progressive spring characteristic. FIG. 3 shows with a curve A the linear relationship between the spring force F and the spring travel s for a conventional cylindrical coil thrust spring wound with a constant pitch from wire material of constant diameter. The spring force F increases linearly with the spring travel s. By suitable dimensioning of the minimum wire diameter d, the maximum wire diameter D and the pitch T, it is possible to achieve progressive spring characteristics with springs according to FIG. 2. It is possible in particular to ensure that with increasing spring travel, the spring force for low values of spring travel s initially increases less markedly than the linear characteristic A, increasing then more intensely at greater values of spring travel than would correspond to the characteristic A. The spring characteristic can be so dimensioned that for equal final spring travel a higher final spring force (curve B) or for equal final spring force a greater final spring travel (curve C) is achieved. For the same final spring travel, it is possible to achieve a 35% greater force while with the same final spring force it is possible to achieve an about 40% greater spring travel. In this way, it is possible within the clutch plate to save on considerable space. In particular, it is possible to save on the clearance space required in the apertures of conventional torsional vibration dampers of progressive characteristic.

It is intended hereinafter to describe alternative coil thrust springs which can be used in the torsional vibration damper of the clutch plate according to FIG. 1 and instead of the spring 25.

Figure 4:
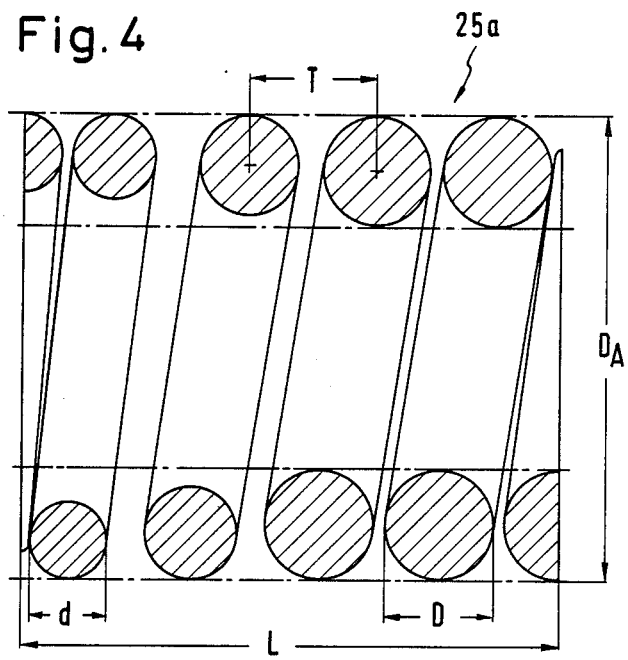

FIG. 4 shows a coil thrust spring 25a which differs from the spring 25 in FIG. 2 essentially in that the cross-section of the wire does not vary continuously over all the turns of the spring but represents the maximum diameter D of wire material over a plurality of turns. The pitch T of the individual turns is however constant with this spring as well.

In the preferred embodiment shown in FIG. 4, the spring has $4\frac{1}{2}$ turns of which the first two, in the region of the right-hand end in FIG. 4, have a constant maximum wire diameter D which is equal to about one-quarter of the spring length L. Immediately adjacent two initial windings of maximum wire diameter D, the wire diameter then decreases continuously to a minimum wire diameter d in the region of the other end, which is chosen to be a fifth to a sixth of the spring length L. For its part, the spring length L amounts to substantially 1.1 to 1.2 times the outside diameter $D_A$ of the spring.

Figure 5:
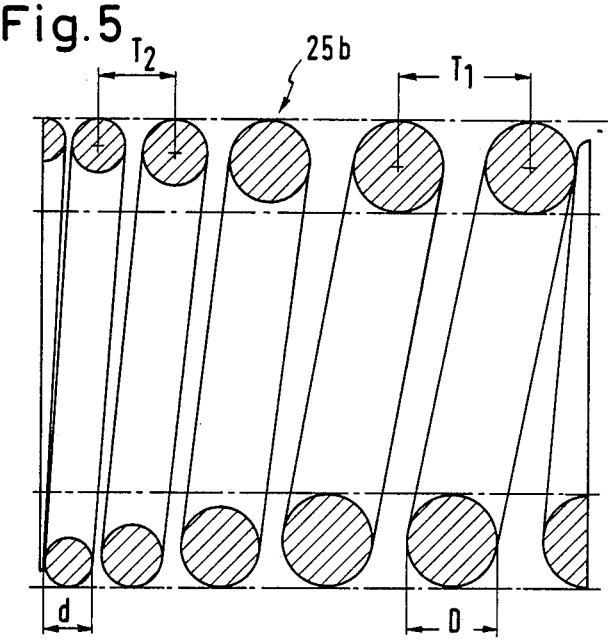

FIG. 5 shows a coil thrust spring 25b which essentially differs from the spring 25a in FIG. 4 only in that the turns wound from wire material of maximum diameter D are made with a pitch $T_1$ which is greater than the pitch $T_2$ in the region of the turns of minimum wire diameter d. Preferably, in the region in which the wire diameter decreases from D to d, the pitch is chosen to be substantially equal to $T_2$. Like the coil thrust spring 25a, the coil thrust spring 25b is of a cylindrical outer contour.

Figure 6:
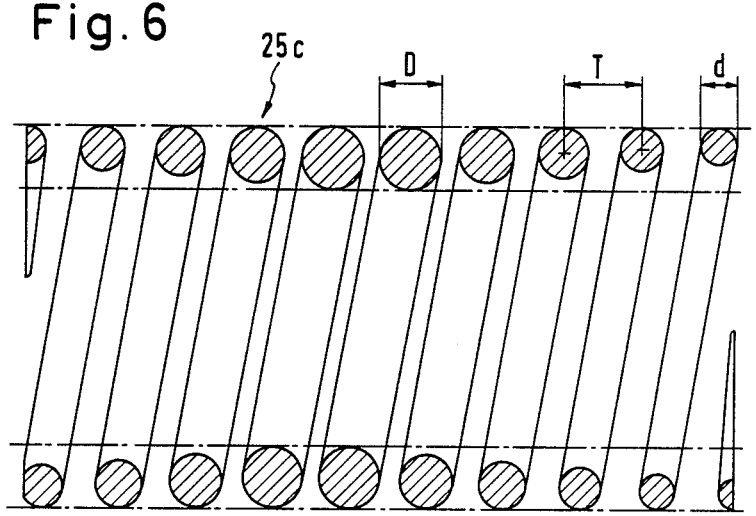

FIG. 6 shows a coil thrust spring 25c in which the wire diameter is at its maximum D in the middle of the spring and diminishes continuously to a minimum d towards the two ends of the spring. The outer contour of the spring 25c is again cylindrical and the pitch T from one turn to the next is constant.

Figure 7:
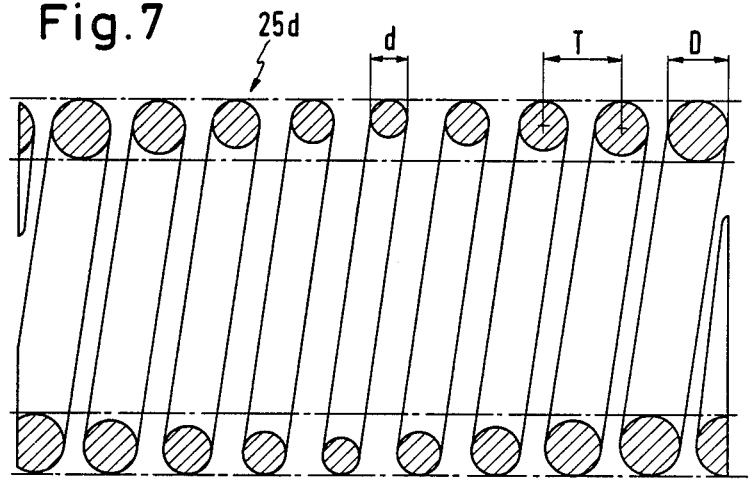

FIG. 7 shows a coil thrust spring 25d which essentially differs from the spring 25c only in that the wire diameter increases from its minimum d in the region of the middle of the spring towards the two ends until it reaches its maximum D. This spring, too, has a cylindrical outer contour and a constant pitch T from turn to turn.

Figure 8:
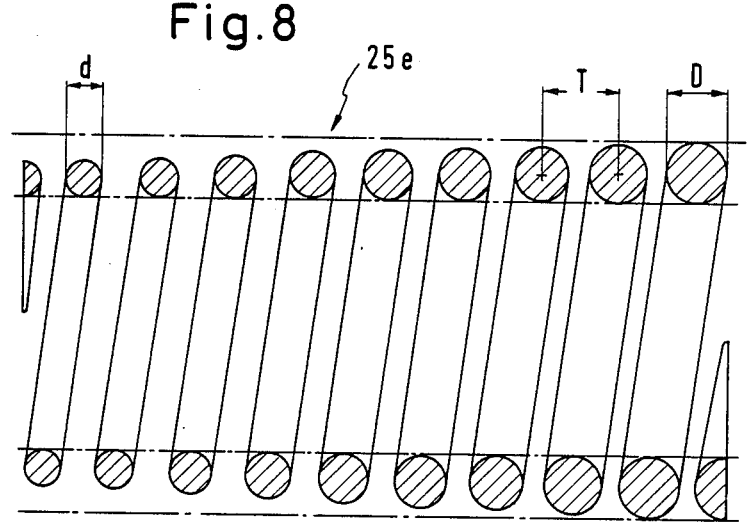

FIG. 8 shows a coil thrust spring 25e which differs essentially from the spring 25 in FIG. 2 only in that it is not the outer contour of the spring but its inner contour which is of cylindrical form. Once again, the spring 25e has a constant pitch T from turn to turn, the wire diameter diminishing continuously from a maximum D at one end of the spring to a minimum d at the other end.

Figure 9:
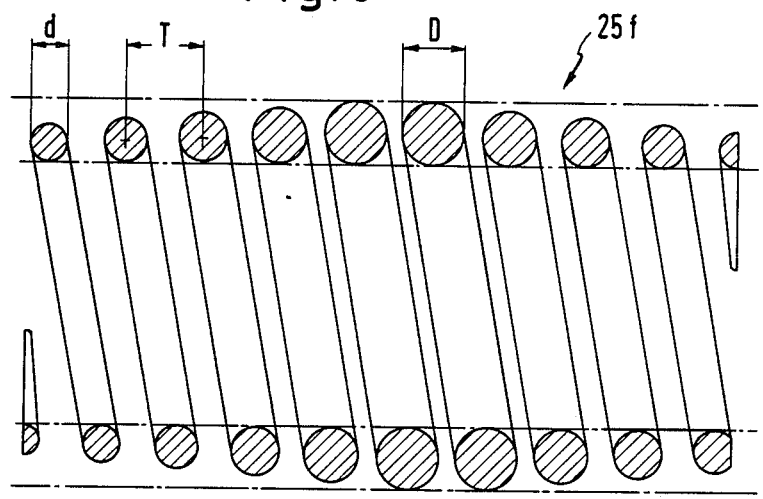

FIG. 9 shows a coil thrust spring 25f which likewise differs from the spring 25c in FIG. 6 only in that the inner contour of the spring is of cylindrical form. The pitch T of the individual turns is constant from turn to turn and the wire diameter diminishes from a maximum D in the region of the middle of the spring towards the two ends until it reaches its minimum d. This alternative embodiment of the spring has the advantage that at its radially outer edge the apertures 19, 21, 23 in FIG. 1 can be curved more markedly than normal with conventional clutch plates, so that the risk of fissuring in the corner zone of these apertures is reduced. It will be appreciated that also with axially symmetrical alternatives as shown in FIGS. 6, 7 and 9, it is possible to provide in the region of the maximum wire diameter D a plurality of turns of constant wire diameter in order to achieve higher final spring force values.

While specific embodiments of the invention have been shown and described in detail to illustrate the application of the inventive principles, it will be understood that the invention may be embodied otherwise without departing from such principles.

What we claim is:

1. A torsional vibration damper comprising
(a) an input part rotatable about an axis of rotation,
(b) an output part rotatable about the axis of rotation and in relation to the input part,
(c) at least one coil spring disposed in axially corresponding apertures in the input part and in the output part and coupling the input part and the output part together in torsionally elastic fashion, the at least one coil spring having a plurality of turns of wire material wound with a constant outer radius so that the turns of wire follow one another in a cylindrical contour, said coil spring being made of wire material the diameter of which increases continuously from the two ends, wherein at least one complete turn of the coil spring has the maximum wire diameter, and wherein the pitch of the turns of wire is constant so that the clearance between adjacent turns of the coil spring increases toward the two ends thereof.

* * * * *